(12) United States Patent
Ohgi

(10) Patent No.: US 11,193,269 B2
(45) Date of Patent: Dec. 7, 2021

(54) HEAT INSULATION SHEET AND SHEET MATERIAL USING HEAT INSULATION SHEET

(71) Applicant: OHGI TECHNOLOGICAL CREATION CO., LTD., Shiga (JP)

(72) Inventor: Takehiko Ohgi, Shiga (JP)

(73) Assignee: OHGI TECHNOLOGICAL CREATION CO., LTD., Shiga (JP)

( * ) Notice: Subject to any disclaimer, the term of this patent is extended or adjusted under 35 U.S.C. 154(b) by 223 days.

(21) Appl. No.: 16/304,052

(22) PCT Filed: Jun. 5, 2018

(86) PCT No.: PCT/JP2018/021485
§ 371 (c)(1),
(2) Date: Nov. 21, 2018

(87) PCT Pub. No.: WO2019/234809
PCT Pub. Date: Dec. 12, 2019

(65) Prior Publication Data
US 2020/0071927 A1    Mar. 5, 2020

(51) Int. Cl.
*E04B 1/80* (2006.01)
*B32B 13/02* (2006.01)
*E01C 19/08* (2006.01)
*E04B 1/76* (2006.01)

(52) U.S. Cl.
CPC .............. *E04B 1/80* (2013.01); *B32B 13/02* (2013.01); *E01C 19/08* (2013.01); *E04B 1/7654* (2013.01)

(58) Field of Classification Search
None
See application file for complete search history.

(56) References Cited

U.S. PATENT DOCUMENTS

| 2005/0079304 | A1 | 4/2005 | Clovesko et al. |
| 2016/0279900 | A1* | 9/2016 | Fujiwara ............... H01L 23/373 |
| 2017/0141009 | A1* | 5/2017 | Nagashima ......... H01L 23/3735 |

FOREIGN PATENT DOCUMENTS

| JP | 02-039933 A | 2/1990 |
| JP | 05-286105 A | 11/1993 |
| JP | 08-209080 A | 8/1996 |
| JP | 11-269441 A | 10/1999 |

(Continued)

OTHER PUBLICATIONS

English Abstractor He et al. CN 201017542 (Year: 2008).*
English Abstract of Kato et al. JP 2014-017173 (Year: 2014).*

*Primary Examiner* — Ronak C Patel
(74) *Attorney, Agent, or Firm* — Muncy, Geissler, Olds & Lowe, P.C.

(57) ABSTRACT

A heat insulation sheet and a sheet material using the heat insulation sheet. The heat insulation sheet is provided with a fixing layer that is arranged between a base material and a carbon sheet. The fixing layer is made of a pressure-sensitive adhesive. The base material has flexibility. The carbon sheet is made by rolling expanded graphite and has a thickness from twenty-five micrometers to one hundred micrometers. In the sheet material, activated carbon is arranged opposite to the fixing layer side of the heat insulation sheet, and a surface material is arranged on a surface of the activated carbon. The fixing layer can be constituted in such a manner that a hot-melt adhesive is arranged in a reticulate manner.

8 Claims, 5 Drawing Sheets

(56) References Cited

FOREIGN PATENT DOCUMENTS

| | | |
|---|---|---|
| JP | 2010-120818 A | 6/2010 |
| JP | 2011-105531 A | 6/2011 |
| JP | 2014-211221 A | 11/2014 |
| JP | 5805772 B2 | 11/2015 |
| JP | 2017221542 A | 12/2017 |
| WO | WO2013/039242 A1 | 3/2013 |

* cited by examiner

HEAT INSULATION SHEET AND SHEET MATERIAL USING HEAT INSULATION SHEET

TECHNICAL FIELD

The present invention relates to a heat insulation sheet having a carbon sheet and, a sheet material using the heat insulation sheet.

BACKGROUND ART

Conventionally, a heat insulation sheet in which a carbon sheet is attached to a base material sheet has been proposed as disclosed in Patent Literature 1. In the heat insulation sheet of the patent literature, an indoor side protective sheet is further provided on a surface of the carbon sheet. Thereby, the heat insulation sheet is constituted to be used as wall cloth capable of enhancing efficiency in indoor cooling and heating operation.

CITATION LIST

Patent Literature

Patent Literature 1: Japanese Patent No. 5805772

SUMMARY OF INVENTION

Technical Problem

In the heat insulation sheet of the above patent literature, because an adhesive is used for lamination of the base material sheet and the carbon sheet, there is a fear of warping due to solidification and contraction of the adhesive or of impairing flexibility. Particularly, when a fixing layer is provided between the sheets by applying the adhesive to the whole surface of the sheet, flexibility of the sheet is impaired significantly.

The heat insulation sheet of the above patent literature is able to be used by being attached to a rigid substrate like wallpaper, but is not suitable for such one as a curtain or a blind that is used in a flexible state. Particularly, when overall thicknesses of the base material sheet and the carbon sheet are increased, flexibility deteriorates naturally and an application range becomes narrow.

When being formed in a roll-like shape as a product, the heat insulation sheet being great in thickness or having low flexibility tends to be bulky and heavy, and becomes difficult to be handled. When the heat insulation sheet including the carbon sheet is broken, there is a fear of scattering carbon powder and blacking around. Therefore, handle-ability is not good in such a point.

An object of the present invention is to provide the heat insulation sheet that has a high heat insulation effect, flexibility, and good handle-ability, and that is able to be used as various sheet materials and to provide the sheet material using the heat insulation sheet.

Solution to Problem

For accomplishing the above-mentioned objects, a heat insulation sheet of one aspect of the present invention is characterized in that the heat insulation sheet is provided with a fixing layer being arranged between a base material and a carbon sheet, the fixing layer being made of a pressure-sensitive adhesive, the base material having flexibility, the carbon sheet being made by rolling expanded graphite and having a thickness from twenty-five micrometers to one hundred micrometers.

A heat insulation sheet of another aspect of the present invention is characterized in that the heat insulation sheet is provided with a fixing layer in which a hot-melt adhesive is arranged in a reticulate manner being arranged between a base material and a carbon sheet, the base material having flexibility, the carbon sheet being made by rolling expanded graphite and having a thickness from twenty-five micrometers to one hundred micrometers.

A sheet material of another aspect of the present invention is characterized in that activated carbon is arranged opposite to the fixing layer side of the heat insulation sheet, and that a surface material is arranged on a surface of the activated carbon.

Advantageous Effects of Invention

Constituted as above, the heat insulation sheet of the present invention has good handle-ability and is able to be used as various sheet materials.

Constituted as above, the sheet material of the present invention has good handle-ability and is able to be used as various sheet materials.

DESCRIPTION OF EMBODIMENTS

An embodiment of the present invention is explained below with reference to accompanying drawings.

Figure 1A:
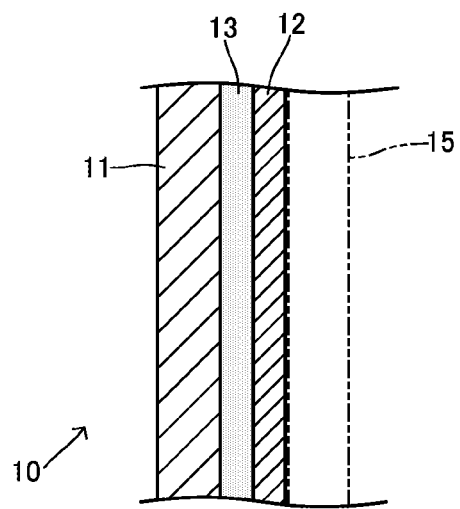
FIG. 1A is a partially enlarged sectional view of the heat insulation sheet of one embodiment of the present invention.
Figure 1B:
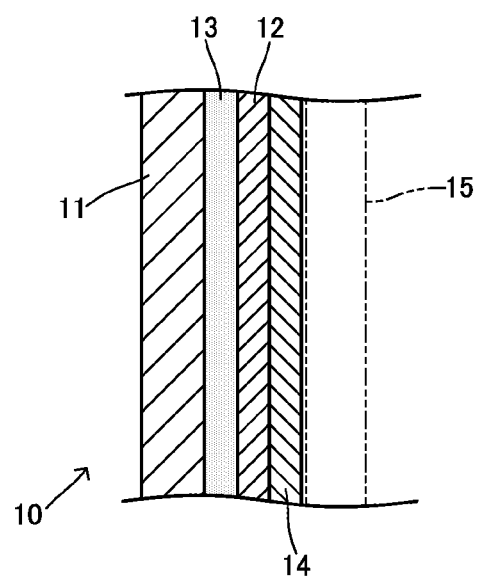
FIG. 1B is a partially enlarged sectional view of the heat insulation sheet of another embodiment of the present invention.

First, a heat insulation sheet 10 is explained below. FIGS. 1A and 1B are partially enlarged sectional views of two kinds of heat insulation sheets 10.

The above-mentioned heat insulation sheets 10 are both such that a fixing layer 13 is arranged between a base material 11 having flexibility and a carbon sheet 12 made by rolling expanded graphite and having a thickness from twenty-five to one hundred micrometers.

The above-mentioned heat insulation sheets 10 are able to be used as a sheet material 1 for various purposes by adding a surface material 15, reference to FIG. 3. Examples of the sheet material 1 includes wall cloth, a curtain, a blind, or the like in which the surface material 15 is arranged on an indoor side. When the sheet material 1 is used as the curtain or the blind, the carbon sheet 12 in an extremely thin shape as in the embodiment does not have a stiff sense of touch and feeling as conventional ones, and is able to have a soft sense of touch and feeling of the curtain or the blind that is made of fabric. An example of the sheet material 1 is to be mentioned later in an explanation of FIG. 3.

Although material of the base material 11 is not limited particularly, when the base material 11 forms wallpaper as the sheet material 1, flame proofing paper that does not burn when carbonized and functions to prevents fire from spreading can be used and is constituted by including pulp, rayon flame proofing agent, or the like. As for flame proofing paper, the one of which weight is 20 g/m² or 40 g/m² is able to be used. Needless to say, it is preferable not to contain a toxic substance such as asbestos and formaldehyde. As for the base material 11, various materials such as non-woven fabric, film, lace, and synthetic resin film can be used in place of paper.

Non-woven fabric is able to be used properly depending on an intended use or a purpose; fiber having various lengths and diameters can be used. A type of fiber is not limited to natural or synthetic one. For instance, when strength and durability are required, aramid fiber can be used; when tensile strength is required, glass fiber can be used; when texture is required, cellulose can be used; when heat resistance is required, nylon can be used. When water resistance and weather resistance are required, vinylon can be used; when texture and durability are required, polyester can be used; for a purpose of industrial material, polyethylene can be used; for a purpose of clothing or an industrial use, particularly when durability is required, polypropylene can be used; for a purpose of medical material or lightweight clothing, polyolefin can be used; when water absorbability is required, rayon can be used.

As for the carbon sheet 12, a flexible sheet made of carbon material is used, for instance. The suitable flexible sheet is produced by expanding crystallized carbon material and made in a thickness from twenty-five to one hunched micrometers by rolling expanded graphite of which carbon ratio is ninety-nine percent. Particularly, the above-mentioned thickness is preferably 50 micrometers. The carbon sheet 12 is preferably manufactured by heat rolling equal to or more than 400 degrees Celsius. When the carbon sheet 12, which is manufactured by heat rolling, is formed thinner, it has higher density, which is desirable. Density of the carbon sheet 12 in the above-mentioned suitable thickness range is set to be 1.35 to 1.8 (g/cm³). However, when a thickness of the carbon sheet 12 becomes lower than 25 micrometers, the carbon sheet 12 is so thin that it breaks easily, and tends to be hard to handle in a process of lamination. When the thickness of the carbon sheet 12 becomes greater than 100 micrometers, a break or a crack tends to occur in a process of folding.

Taking flexibility of the sheet material 1 as a final mold article into account, the carbon sheet 12 having a thickness equal to or lower than sixty micrometers is preferable to be used; further, taking handle-ability into account, the carbon sheet 12 is preferable to have the thickness equal to or more than thirty micrometers. As long as the carbon sheet 12 has the thickness from thirty to sixty micrometers and is attached with paper, synthetic resin film, or non-woven fabric as the base material 11, the carbon sheet 12 is hardly broken and easily handled in the process of lamination and there is little possibility of the break or the crack even when the carbon sheet 12 is folded.

The carbon sheet 12 is made by arraying a crystal in surface direction; therefore, heat conductivity rate in surface direction, i.e. substantially orthogonal to thickness direction, is especially high. According to a test of the carbon sheet 12 having the thickness of 50 micrometers, heat conductivity in surface direction was 400 to 500 W/(m–K), i.e. watts per meter-Kelvin; on the other hand, heat conductivity rate in thickness direction was three to seven W/(m–K) because of a multi-layer structure. However, according to a test of the carbon sheet 12 having the thickness of 130 micrometers, heat conductivity rate in surface direction was 200 to 250 W/(m–K); heat conductivity rate in thickness direction was the same as that of the carbon sheet 12 having the thickness of 50 micrometers. In other words, if the carbon sheet 12 having a thickness of about 50 micrometers is used in wallpaper, adiabaticity (heat insulation performance) is excellent and indoor cooling/heating efficiency is also excellent.

The carbon sheet 12 satisfies the criterion of "a pyrogenetic test" in a fireproof material test, and has incombustibility or fire resistance. If flame proofing paper is used as the base material 11 as mentioned above, the heat insulation sheet 10 has high incombustibility (semi-incombustibility) and flame resistance and has a wide application range. Furthermore, when the carbon sheet 12 is laminated with the surface material 15 and is used as wall cloth, the carbon sheet 12 itself does not burn, and thus the wall cloth has incombustibility (semi-incombustibility); therefore, there is no need to use flame proofing paper as the base material 11.

The fixing layer 13 is arranged between the base material 11 and the carbon sheet 12. The fixing layer 13 is made of a pressure-sensitive adhesive 13a, reference to FIG. 2, in a liquid state or in a gel state for laminating the base material 11 and the carbon sheet 12. As for the pressure-sensitive adhesive 13a, various publicly known ones in acrylic base, rubber base, silicon base, urethane base, or the like are able to be used. Specifically, an acrylic solvent-based pressure-sensitive adhesive (acrylic acid ester copolymer) is suitable because of its high pressure-sensitive adhesiveness and excellence in weather resistance. A silicon-based pressure-sensitive adhesive is able to resist heat equal to or more than 200 degrees Celsius. As for the pressure-sensitive adhesive 13a, a hot-melt pressure-sensitive adhesive can be used.

Figure 2:
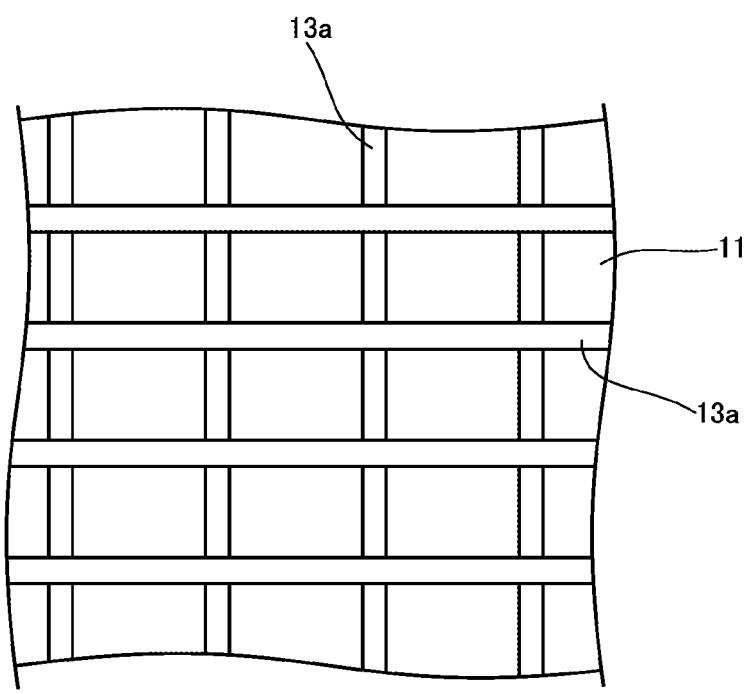
FIG. 2 is a partial plan view that illustrates one example of a forming process of the fixing layer of the heat insulation sheet.

A lamination procedure can be such that the pressure-sensitive adhesive 13a is applied onto a lamination face of the base material 11 and then the carbon sheet 12 is laminated onto the face of the pressure-sensitive adhesive 13a as illustrated in FIG. 2. A method of application can be such that the pressure-sensitive adhesive 13a is applied all over the lamination face or is applied in a reticulate manner as illustrated in FIG. 2. The pressure-sensitive adhesive 13a can be sprayed on the lamination face.

The adhesive, when used for lamination, decreases in followability because the adhesive is solidified; flexibility of the base material 11 and the carbon sheet 12 decreases. Especially when the adhesive, for instance, made of thermoset resin is used, the adhesive hardens at a fixed temperature; if the base material 11 contracts by a change in temperature, the adhesive does not follow and a crinkle or the like is caused. A melting point of thermoplastic resin is generally equal to or more than 80 degrees Celsius; when the adhesive, for instance, made of thermoplastic resin is applied to wall cloth as the sheet material 1 as mentioned above, the followability of the adhesive is not anticipated and the crinkle or the like is caused. Therefore, in the embodiment, the pressure-sensitive adhesive 13a is used. The adhesive can also be used if it is devised to be mentioned below.

Because the heat insulation sheet 10 includes the pressure-sensitive adhesive 13a (reference to FIG. 2) for lamination, flexibility and elastic behavior of the heat insulation sheet 10 are able to be maintained even after lamination. For maintaining the heat insulation sheet 10 in appropriate flexibility, about two to three micrometers, for instance, in thickness of the fixing layer 13 is enough.

When applied in the reticulate manner as illustrated in FIG. 2, the pressure-sensitive adhesive 13a spreads substantially all over the lamination face, and an outer face of the carbon sheet 12 is finished without unevenness. If the pressure-sensitive adhesive 13a is applied in the reticulate manner as above or a reticulate dry pressure-sensitive sheet is used, the fixing layer 13 is thinner by lamination, and the pressure-sensitive adhesive 13a is also reduced. Because a reticulate space is formed, air permeability is provided.

In place of the pressure-sensitive adhesive 13a, the fixing layer 13 can be formed by using the hot-melt adhesive of which main component is thermoplastic resin. The hot-melt adhesive can be arranged in the reticulate manner the same as FIG. 2. The hot-melt adhesive in the reticulate manner which is formed in a sheet (film) can be used. The hot-melt adhesive of which material is low density polyethylene, ethylene vinyl acetate, synthetic rubber, copolyamide, copolyester, or the like is used. Synthetic rubber is suitable for any kind that requires stretch ability or elasticity. Copolyamide is suitable for clothing that requires adhesive strength.

By the fixing layer 13 in which the hot-melt adhesive is arranged in the reticulate manner, followability is excellent; flexibility and plastic behavior are hardly impaired because a bonded part is smaller than the fixing layer 13 in which the adhesive is arranged all over a sheet face. As used herein, the term "reticulated manner" means that the pressure-sensitive adhesive 13a or the adhesive is arranged on a plane in a separated state; the state can be like a spider's web or like non-woven fabric (a state in which fabric is irregularly scattered).

If a double-sided hot-melt pressure-sensitive adhesive sheet or a double-sided hot-melt adhesive sheet is used, either of the above sheets is inserted in a space between the base material 11 and the carbon sheet 12 and is able to fix the space between the base material 11 and the carbon sheet 12 while melting the sheet by a heat roller. Thereby, the heat insulation sheet 10 is able to be formed easily.

Because the carbon sheet 12 has the thickness from twenty-five to one hundred micrometers, the carbon sheet 12 and the heat insulation sheet 10 using the carbon sheet 12 are both able to be handled in a reeled state. For instance, even a reel of 500 meters is able to be handled easily.

As illustrated in FIG. 1B, the heat insulation sheet 10 can be such that a vapor-deposition layer 14 made of metal is formed opposite to a fixing layer 13 side of the carbon sheet 12. As for metal constituting the vapor-deposition layer 14, silver, aluminum, copper, or the like is adoptable, for instance. Because the vapor-deposition layer 14 is able to be formed in a thickness from twenty to fifty nm, a thickness of the entire heat insulation sheet 10 is hardly affected.

The heat insulation sheet 10 described as above is able to from the sheet material 1 of various types, reference to FIG. 3, by attaching a surface material 15 to the outer face of the carbon sheet 12 (or of the vapor-deposition layer 14). Being thin and flexible, the heat insulation sheet 10 can be used for anything that requires flexibility such as the curtain or the blind. Needless to say, the heat insulation sheet 10 can be used for a building material sheet for wall material, flooring material, ceiling material, or the like. Further, the heat insulation sheet 10 can be used for an interior sheet for a car, a ship, a train, an elevator, or the like. Furthermore, the heat insulation sheet 10 can be used in a freezer of a freezer car, in which, if the heat insulation sheet 10 is attached to the base material 11 made of non-woven fabric, adiabaticity and heat conductivity are further enhanced, and cooling efficiency becomes excellent. Furthermore, non-woven fabric can be attached as the surface material 15.

The surface material 15 uses various materials, for instance, a paper sheet such as Japanese paper, a fabric sheet such as cloth made from kudzu (Japanese arrowroot) fiber, a textile fabric sheet such as Nishijin brocade, a vinyl chloride sheet (PVC, polyvinyl chloride), and natural leather. To form the sheet material 1 thinner, it is preferable to use the surface material 15 having a thickness equal to or less than one millimeter, preferably about 0.5 millimeter. Needless to say, the surface material 15 can be greater in thickness, and can be uneven in surface such as fabric or leather to which embossing is applied. In addition, the surface material 15 is preferable to have good ventilation.

In any case of the above, heat insulation performance of the carbon sheet 12 enhances heat efficiency in a room, in a car, or in a ship.

The heat insulation sheet 10 without the surface material 15 can be laid under slate roof material or can be buried under ground for a road equipped with snow melting facilities. When provided under roof material, the heat insulation sheet 10 can be laminated with the surface material 15 such as film. For instance, the heat insulation sheet 10 can be provided between asphalt and cement. Further, because the heat insulation sheet 10 is excellent in elastic behavior and is resistant to a harsh environment with a large temperature change, the heat insulation sheet 10 can be used by being wrapped around a pipe intended to have heat conductivity such as a laying pipe of floor heating, and a laying pipe of the road equipped with snow melting facilities. Furthermore, the heat insulation sheet 10 can be used for termite prevention by being attached to an inner face of a foundation wall.

Japanese paper or the Nishijin brocade woven of silk is difficult to be incombustible material but has the incombustibility and the fire resistance when being laminated with the carbon sheet 12. Because the vinyl chloride sheet has various design styles and variations both in color and pattern, functionality is imparted to the vinyl chloride sheet by being laminated with the carbon sheet 12. In addition, when the vinyl chloride sheet or leather is laminated with the carbon sheet 12, the vinyl chloride sheet is preferable to be provided with a pore in order to make use of various effects of the carbon sheet 12.

By the heat insulation sheet 10 having the vapor-deposition layer 14, reference to FIG. 1B, heat conductivity in surface direction is further enhanced. If the surface material 15 in the reticulate (meshed) manner is arranged on a surface of the vapor-deposition layer 14, metallic color is expressed through a reticulate clearance, which is described in detail in explanation of FIG. 5.

Because the heat insulation sheet 10 described as above includes the carbon sheet 12, if the heat insulation sheet 10 is arranged nearby a human body, for instance, is applied to wall cloth, far infrared radiation is radiated, and thereby a health promotion effect on a human body is exhibited.

Figure 3A:
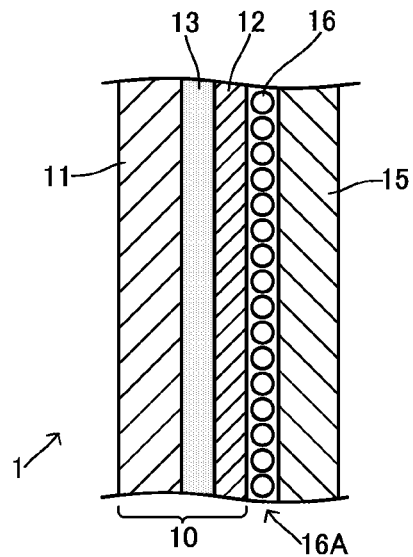
FIG. 3A is a partially enlarged sectional view of the sheet material of one embodiment of the present invention.
Figure 3B:
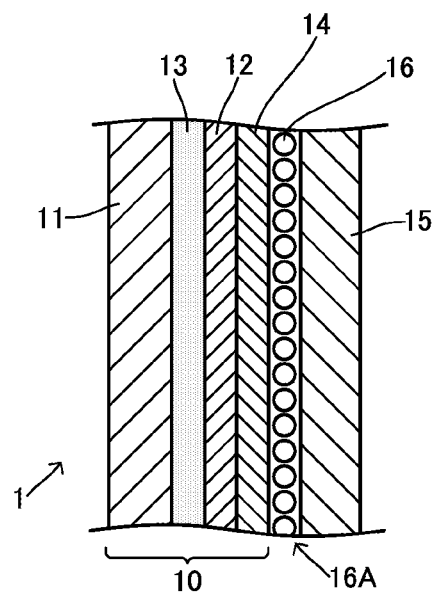
FIG. 3B is a partially enlarged sectional view of the sheet material of another embodiment of the present invention.

Second, a sheet material 1 using the heat insulation sheet 10 is explained below with reference to FIG. 3 to FIG. 5. FIG. 3A illustrates the sheet material 1 using the heat insulation sheet 10 of FIG. 1A. FIG. 3B illustrates the sheet material 1 using the heat insulation sheet 10 of FIG. 1B. Hence, explanation for the heat insulation sheet 10 is omitted.

In each above-mentioned sheet material 1 activated carbon, i.e. a globular particulate activated carbon 16 in the figures, is held between the carbon sheet 12 and the surface material 15, and the globular particulate activated carbon 16 can house a deodorizing-decomposing enzyme 17 as in the figures. In the sheet material 1, because the globular particulate activated carbon 16 does not touch the human body, the activated carbon formed by carbonizing a plastic bottle or the like can be used instead of the globular particulate activated carbon 16, thereby reducing manufacturing cost.

In the figures, the sheet material 1 is illustrated so as to be used for wallpaper (wall cloth). However, the sheet material 1 constituted as above can be used for a surface material for the curtain, the blind, and a partition, the building material sheet for a wall, a floor, or the like. As for the globular particulate activated carbon 16, multiple globular particles of which grain diameters are each 150 to 600 micrometers are used. The globular particulate activated carbon 16 is preferable to have a deodorizing effect similar to general activated carbon. As for the surface material 15, such one for building material sheet (wall cloth) is used.

In each of the sheet materials 1 illustrated in FIGS. 3A and 3B, an activated carbon layer 16A in which the multiple globular particulate activated carbons 16 are fixed and held by the adhesive is interposed and held between the carbon sheet 12 (or the vapor-deposition layer 14), and the surface material 15. In the sheet material 1 of FIG. 3A the activated carbon layer 16A is arranged directly on the carbon sheet 12. On the other hand, in the sheet material 1 of FIG. 1B, the vapor-deposition layer 14 is formed in such a manner that metal is deposited by vapor on a surface of the carbon sheet 12, and the activated carbon layer 16A is further arranged on the vapor-deposition layer 14.

The globular particulate activated carbon 16 held between the carbon sheet 12 (or the vapor-deposition layer 14), and the surface material 15 is formed substantially in a true globular shape. The globular particulate activated carbon 16 is fixed to and held by the activated carbon layer 16A between two sheets.

The globular particulate activated carbon 16 soaked into ionomer resin solution, not illustrated in the figures, can be held by being interposed between the two sheets. More specifically, the above-mentioned solution in which the multiple globular particulate activated carbons 16 are soaked is applied to one face of the carbon sheet 12 (or of the vapor-deposition layer 14), and the surface material 15 can be laminated on the one face. In addition, the activated carbon layer 16A can be formed in such a manner that the globular particulate activated carbon 16 is interposed by other adhesives.

A hot-melt adhesive sheet can also be used. Before laminating the hot-melt adhesive sheet and the surface material 15, the globular particulate activated carbon 16 is scattered on the hot-melt adhesive sheet; the hot-melt adhesive sheet can be inserted into the heat roller and is stuck with the surface material 15.

Figure 4:
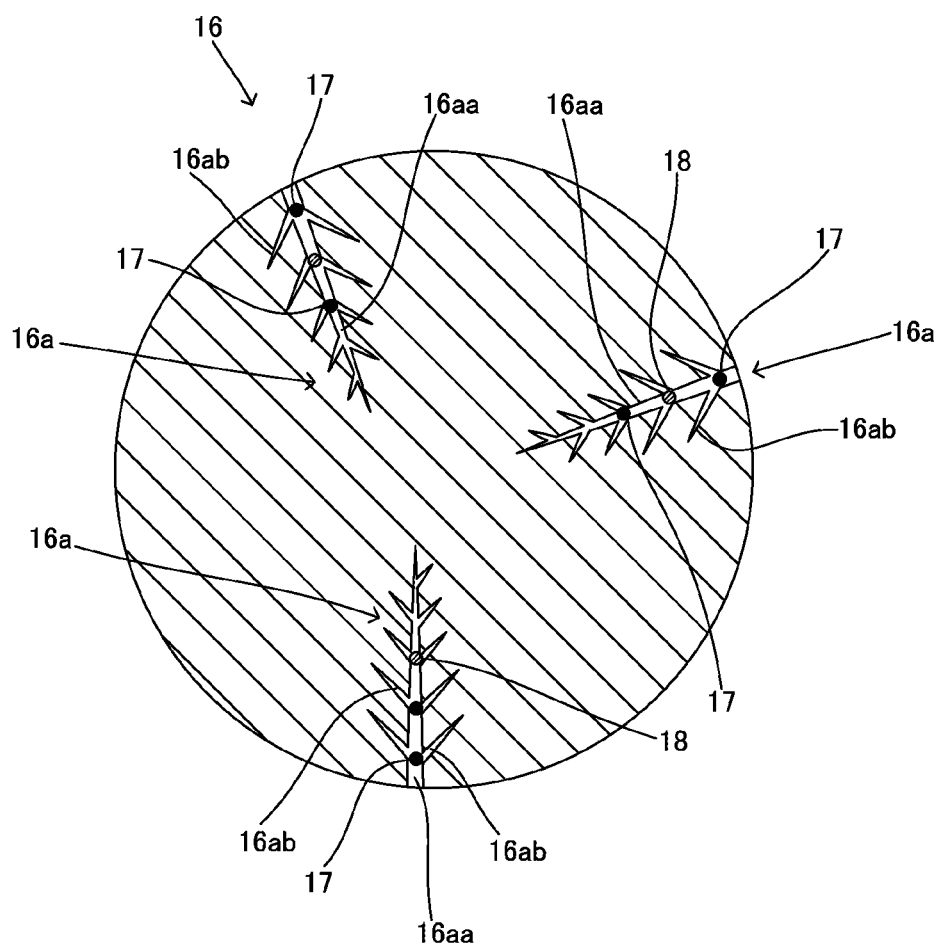
FIG. 4 is an enlarged sectional view of activated carbon used in FIGS. 3A and 3B.

As illustrated in the enlarged sectional view of FIG. 4, a plurality of pore portions 16a that open toward a surface of a globe are formed inside the globular particulate activated carbon 16. The pore portions 16a have a plurality of macro-pores 16aa that are formed toward an inside of the globe; the macro-pores 16aa are formed respectively with a plurality of micro-pores 16ab branched from the macro-pores 16aa as a trunk. A pore diameter dimension of the micro-pores 16ab is smaller than that of the macro-pores 16aa. Because the plurality of pore portions 16a constituted as above are provided, the globular particulate activated carbon 16 is ultraporous.

Being made of carbon material, the globular particulate activated carbon 16 radiates far infrared radiation. The globular particulate activated carbon 16 of which carbon purity is equal to or more than 90 percent, preferably equal to or more than 99.9 percent, can be used. Further, the globular particulate activated carbon 16 of which spherical diameter is 150 to 600 micrometers is preferable. For suppressing variation in size, the globular particulate activated carbon 16 of which spherical diameter is 180 to 500 micrometers is more preferable.

Furthermore, the globular particulate activated carbon 16 of which pore volume is 0.9 to 2.0 $cm^3/g$ and of which pore peak diameter is 0.5 to 2.0 nanometers can be used. As used herein, the pore volume is sum of volume inside all pores of the macro-pores 16aa and the micro-pores 16ab that are formed inside the globular particulate activated carbon 16. The pore peak diameter means the largest diameter in the opening diameters of the pore portions 16a on a surface of the globular particulate activated carbon 16.

In the embodiment, the globular particulate activated carbon 16 is constituted by carbonized phenol resin in such a manner that a specific surface area is equal to or more than 1000 $m^2/g$. As used herein, the specific surface area is sum of an area of the surface of the globe of the globular particulate activated carbon 16, and of areas of surfaces constituting the macro-pores 16aa and the micro-pores 16ab of all of the pore portions 16a.

The globular particulate activated carbon 16 can be manufactured as follows, for example. First, raw material such as phenol resin is crushed into pieces, and crushed pieces are processed, thereby obtaining a plurality of globes. After carbonizing the globes under a high temperature, for instance, about 700 to 800 degrees Celsius, such processed material is reacted with steam under a high temperature, for instance, about 900 to 1000 degrees Celsius, i.e. steam activation. By the steam activation, an ultraporous structure is formed; in such a case, the specific surface area is 1,000 to 2,000 $m^2/g$. Impurity is eliminated by refining, sieving is performed, thereby the globular particulate activated carbon 16 in which the multiple pore portions 16a have intended grain diameters and intended pore diameters of the macro-pore 16aa and of the micro-pore 16ab is obtained.

When the activated carbon reused from the plastic bottle is used in place of the globular particulate activated carbon 16, the activated carbon is obtained in such a manner that the plastic bottle is activated after being carbonized in a flake shape. Also in such a case, the activated carbon of which specific surface area is 1000 to 2000 $m^2/g$ is obtained.

The above-mentioned activation is not limited to the steam activation, and can be performed by using carbon dioxide, air, or the like. Alkali activation using KOH or the like can be performed. The raw material of the globular particulate activated carbon 16 is not limited to the phenol resin, and can be coconut carbon, caustic lime, or the like. When the plastic bottle is used as the raw material, the globular particulate activated carbon 16 of which specific surface area is 2,500 to 3,600 $m^2/g$ is obtained.

The globular particulate activated carbon 16 can be a "B's Wiper" (registered trademark) product or can be manufactured by a method disclosed in Japanese Patent No. 4266711, or Japanese Patent No. 4308740.

Preferably, the globular particulate activated carbon 16 is not broken into pieces even if strong pressure or impact is added, and there is no fear that coloring matter or the like adheres to human skin or the like. Further, the globular particulate activated carbon 16 is preferable to have a neutral pH-value of about seven.

As illustrated in FIG. 4, the globular particulate activated carbon 16 houses the deodorizing-decomposing enzyme 17 as a functional substance. The deodorizing-decomposing enzyme 17 can be an artificial enzyme that oxidizes an odor component by activated oxygen, changes the odor component into a different substance, and decomposes the odor component.

As for the deodorizing-decomposing enzyme 17, there is "DEORASE" (registered trademark) available. Because "DEORASE" (registered trademark) does not deteriorate the deodorizing effect by desorption of central metal under an alkaline condition and creates Cycle Reaction in a similar manner with an invivo enzyme, "DEORASE" (registered trademark) outstandingly maintains the deodorizing effect as compared with deodorant using other chemical reaction. Generally speaking, it is known that reactivity of the cycle reaction deteriorates because of moisture by absorption of moisture. To the contrary, in "DEORASE" (registered trademark), reactivity is improved by absorption of moisture.

Except for the above, the deodorizing-decomposing enzyme 17, for instance, using iron phthalocyanine that is the artificial enzyme can be adopted.

The globular particulate activated carbon 16 houses an antibacterial agent 18 as another functional substance. As for the antibacterial agent 18, an inorganic antibacterial agent 18 can be used; the antibacterial agent 18 constituted by carrying metal or a metallic ion that has an antibacterial effect on an inorganic carrier can be used. As for the inorganic antibacterial agent 18, an inorganic antibacterial agent that is powder and silver-based, e.g. "NOVARON" (registered trademark), can be used. The inorganic antibacterial agent 18 can be dissolved or dispersed into a solution, and be impregnated into the pore portions 16a of the globular particulate activated carbon 16. Thereby, the sheet material 1 including the globular particulate activated carbon 16 has an antibacterial effect of hardly breeding various germs, and deterioration of the sheet material 1 is suppressed.

When the skin of the human body touches wallpaper, perspiration on the human skin or sebum is absorbed into the wallpaper and is decomposed by the various germs on a surface of the human skin, thus causing an offensive odor called a decomposing odor. If the antibacterial agent 18 as mentioned above is impregnated into the globular particulate activated carbon 16, the various germs are thus killed, decomposition of the perspiration or sebum by the various germs is suppressed, and generation of the offensive odor is suppressed.

As illustrated in FIG. 4, the above-mentioned functional substances are housed inside the pore portions 16a of the globular particulate activated carbon 16. Although the figures illustrate an example in which the functional substance is housed inside the macro-pores 16aa of the pore portions 16a, the functional substance can also be housed inside the micro-pores 16ab. Because the globular particulate activated carbon 16 has the plurality of pore portions 16a and is ultraporous, a plurality of functional substances are effectively impregnated inside the pore portions 16a. In addition, a perfuming agent can be impregnated into the globular particulate activated carbon 16 as the functional substance.

Because the sheet materials 1 in FIGS. 3A and 3B are both intended to be used as wallpaper, the surface material 15 for wall cloth is arranged on a surface side (an indoor face side) of the sheet material 1. Specifically, in the sheet material 1 illustrated in FIGS. 3A and 3B, the surface material 15 for wall cloth is attached onto the indoor face side of the carbon sheet 12 with the activated carbon layer 16A therebetween.

As mentioned above, various sheets are used for the surface material 15 including the paper sheet such as Japanese paper, the fabric sheet such as cloth made from kudzu (Japanese arrowroot) fiber, the textile fabric sheet such as Nishijin brocade, or the sheet woven by various yarn made of paper. In the embodiment, paper or cloth is used more preferably than synthetic resin such as vinyl chloride. For exhibiting the satisfactory deodorizing effects of the globular particulate activated carbon 16 and of the deodorizing-decomposing enzyme 17, the surface material 15 is preferable to have good ventilation.

Figure 5:
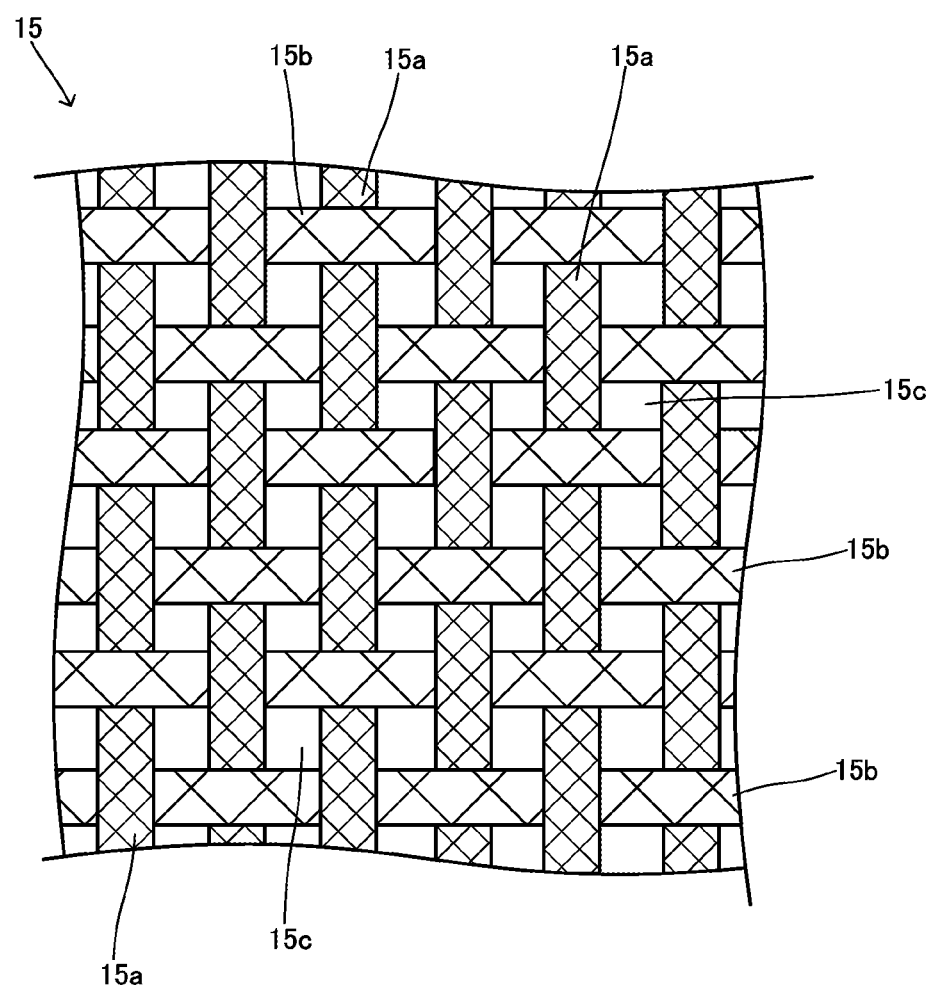
FIG. 5 is a partial plan view of one example of the sheet material illustrated in FIGS. 3A and 3B.

FIG. 5 illustrates a plan view of an indoor side face of the heat insulation sheet 10 using the textile fabric sheet as the surface material 15. The surface material 15 is made by weaving a vertical material 15a and a horizontal material 15b in a reticular pattern. In the example of FIG. 5, an interstice 15c in a refine square is formed in a texture. For descriptive purposes, in FIG. 5, the vertical material 15a is provided with fine cross-hatching; the horizontal material 15b is provided with rough cross-hatching.

Base color can be expressed through the interstice 15c. For instance, as illustrated in FIG. 3B, if a substrate through the activated carbon layer 16A is the vapor-deposition layer 14 made of silver or aluminum flake powder, metallic color of a vapor-deposition surface is expressed through the interstice 15c, and the sheet material 1 as a whole expresses a wall surface having nuance in which metallic color is mixed. In addition, light reflecting color of metal is able to represent a sense of luxury. When lace is used as the surface material 15, a similar effect is exhibited.

The surface material 15 also functions as a protection member for the activated carbon layer 16A containing the globular particulate activated carbon 16. Furthermore, transparency film or transparency resin material can be applied on a surface of the surface material 15 for preventing leakage of the globular particulate activated carbon 16 from the interstice 15c of the surface material 15.

As mentioned above, because the sheet material 1 includes the heat insulation sheet 10 (the carbon sheet 12), heat in surface direction is effectively conducted; if the sheet material 1 is applied for wallpaper, cool air or warm air of indoor space is rapidly transmitted in surface direction of wallpaper, the entire indoor wall surface becomes close to indoor temperature and is kept. Because the sheet material 1 hardly conducts heat in thickness direction, a high heat insulation effect is exhibited.

In other words, by the sheet material 1, because the sheet material 1 includes the heat insulation sheet 10, cool air or warm air in a room is effectively maintained, and outdoor air is blocked by using the sheet material 1 for wallpaper of a living room. Thereby, power consumption in indoor cooling and heating operation decreases. If the carbon sheet 12 is formed with the vapor-deposition layer 14 made of metal (for instance, aluminum flake powder), heat conductivity of the carbon sheet 12 in surface direction is maintained or heat conductivity of a whole surface is enhanced, and a power-saving effect is further increased. Increase in the power-saving effect leads to reduction in carbon dioxide emissions.

A measurement experiment was performed on the wallpaper made of the sheet material 1 using the carbon sheet 12 having the thickness of 130 micrometers, and on the wallpaper made of vinyl chloride having the same plane dimension, under a preset temperature of 28 degrees Celsius for a period of 14 days. As a result, the wallpaper made of the sheet material 1 achieved a power reduction of equal to or more than 27 percent than the vinyl chloride wallpaper. Hence, the wallpaper using the carbon sheet 12 having a thickness of 50 micrometers achieves an estimated power reduction of equal to or more than 50 percent.

Usual air conditioner use is exemplified, an electric charge being 5,000 yen every month per household. The power reduction of 50 percent leads to a reduction in the electric charge and the carbon dioxide emissions per household as follows.

Electric Charge: 5,000 yen reduced to 2,500 yen by the power reduction of 50 percent
Carbon Dioxide Emissions: (5,000/26.19)*0.493=94 (kg) reduced to 47 (kg) by the power reduction of 50 percent
26.19: Unit Price, Yen/kWh
0.493: Power Factor calculated by Electric Power Company, kg/kWh
Estimate of the Carbon Dioxide Emissions in Kyoto City: 717,000 (households number)*(94 minus 47)=33,699 (t) of emissions reduced Although using electricity in household does not generate carbon dioxide, much carbon dioxide is generated in the process of power generation. Electricity generates more carbon dioxide than gas before they are used in household.

Because the sheet material 1 houses the globular particulate activated carbon 16 containing the deodorizing-decomposing enzyme 17, the odor component is effectively absorbed and decomposed, and the indoor space is kept in a clean state in conjunction with the deodorizing effect of the globular particulate activated carbon 16 itself by using the sheet material 1 for the wallpaper of the living room. Especially, because the specific surface area rate of the globular particulate activated carbon 16 is 1,000 to 2,000 $m^2/g$ in the embodiment, much deodorizing-decomposing enzyme 17 is housed into the globular particulate activated carbon 16. Because the deodorizing-decomposing enzyme 17 decomposes the odor component, the deodorizing effect is hardly attenuated, and the sheet material 1 is used for a long term with a deodorizing function.

When an absorbing-decomposing experiment was performed on ammonia by using the globular particulate activated carbon 16, manufactured by the methods disclosed in Japanese Patent No. 4266711 and Japanese Patent No. 4308740, in which the deodorizing-decomposing enzyme 17 is housed, gas concentration was reduced in a short term. The artificial enzyme exhibited an odor absorbing-decomposing effect in an experiment on acetaldehyde, hydrogen sulfide, methyl mercaptan, or the like. The sheet material 1 which includes the globular particulate activated carbon 16 containing the deodorizing-decomposing enzyme 17, and the carbon sheet 12 as mentioned above is given F☆☆☆☆ (F four stars) that is the highest rank standard in a formaldehyde grade, i.e. the highest rank grade that is displayed on a product having the lowest divergence level of formaldehyde.

Further, because the globular particulate activated carbon 16 also includes the antibacterial agent 18, the antibacterial effect is also exhibited and the indoor space is kept in the clean state in conjunction with a deodorizing effect by the deodorizing-decomposing enzyme 17.

The sheet material 1 is constituted by a substance harmless to the human body such as carbon material (the globular particulate activated carbon 16 and the carbon sheet 12) and flame proofing paper (the base material 11), and does not contain the toxic substance such as formaldehyde. The sheet material 1 thus is used for indoor wallpaper or the like without worry. Further, because the sheet material 1 includes carbon material, far infrared radiation is radiated, and thereby the health promotion effect on the human body is exhibited.

Graphite, material of the carbon sheet 12 having electrical conductivity, has a characteristic of generating heat in an electromagnetic cooker because graphite has a greater resistance value than copper, aluminum, or the like. In other words, graphite is not magnetic material and is capable of reflecting electromagnetic wave. Hence, the carbon sheet 12 has an electromagnetic shield effect, and the sheet material or the heat insulation sheet 10 including the carbon sheet 12 is also utilized as an electromagnetic wave shielding sheet.

As mentioned above, the sheet material 1 is not only used as the wallpaper but also can be used for various building material sheets such as a flooring sheet, and a ceiling sheet. Being able to be formed in a thin flexible sheet, the sheet material 1 can be used for the curtain or the blind. The sheet material 1 can also be used for interior material of the car, the train, or the ship and for the surface material 15 of a sheet. Because the heat insulation sheet 10 is formed thinner, if thin surface material 15 is used for addition to the heat insulation sheet 10, it goes without saying that the sheet material 1 becomes easily handled.

The heat insulation sheet 10 as mentioned above is exemplified as material for the sheet material 1 mainly used indoors but can be used as the sheet material 1 for outdoors. Waterproofing can be performed on the sheet material 1. Thereby, the sheet material 1 is used for the outdoors exposed to the rain, a bathroom, a toilet room or the like.

REFERENCE SIGNS LIST 1 sheet material
10 heat insulation sheet
11 base material
12 carbon sheet
13 fixing layer
13a pressure-sensitive adhesive
14 vapor-deposition layer
15 surface material
15a vertical material
15b horizontal material
15c interstice
16A activated carbon layer
16 globular particulate activated carbon (activated carbon)
16a pore portion
16aa macro-pore
16ab micro-pore
17 deodorizing-decomposing enzyme
18 antibacterial agent

The invention claimed is:

1. A heat insulation sheet for use in an interior material for a wall, a ceiling, a curtain, and a blind, the heat insulation sheet comprising:
   a base material made of paper or fabric and having flexibility;
   a carbon sheet made by rolling expanded graphite and having a thickness from twenty-five micrometers to one hundred micrometers;
   a fixing layer being arranged between the base material and the carbon sheet, the fixing layer being made of an acrylic solvent-based hot-melt pressure-sensitive adhesive or a silicon-based hot-melt pressure-sensitive adhesive, and
   a surface material with ventilation property attached to an outer face of the carbon sheet,
   wherein the surface material is a paper sheet, a fabric sheet, a textile fabric sheet, a vinyl chloride sheet, or a natural leather,
   wherein a vapor-deposition layer made of metal is formed opposite to a fixing layer side of the carbon sheet.

2. The heat insulation sheet for use in an interior material for a wall, a ceiling, a curtain, and a blind as set forth in claim 1, wherein the fixing layer is made of a pressure-sensitive sheet.

3. The heat insulation sheet for use in an interior material for a wall, a ceiling, a curtain, and a blind as set forth in claim 2, wherein the fixing layer is made by arranging the pressure-sensitive adhesive on a surface of the base material in a reticulate manner.

4. The heat insulation sheet for use in an interior material for a wall, a ceiling, a curtain, and a blind as set forth in claim 1, wherein the fixing layer is made by arranging the pressure-sensitive adhesive on a surface of the base material in a reticulate manner.

5. A sheet material, wherein:
   activated carbon is arranged opposite to the fixing layer side of the heat insulation sheet as set forth in claim 1; and
   the surface material is arranged on a surface of the activated carbon.

6. A sheet material, wherein:
   activated carbon is arranged opposite to the fixing layer side of the heat insulation sheet as set forth in claim 2; and
   the surface material is arranged on a surface of the activated carbon.

7. A sheet material, wherein:
   activated carbon is arranged opposite to the fixing layer side of the heat insulation sheet as set forth in claim 4; and
   the surface material is arranged on a surface of the activated carbon.

8. A sheet material, wherein:
   activated carbon is arranged opposite to the fixing layer side of the heat insulation sheet as set forth in claim 3; and
   the surface material is arranged on a surface of the activated carbon.

\* \* \* \* \*